W. LOUDEN.
STRUCTURAL COUPLING.
APPLICATION FILED FEB. 5, 1913.
1,192,216.
Patented July 25, 1916.
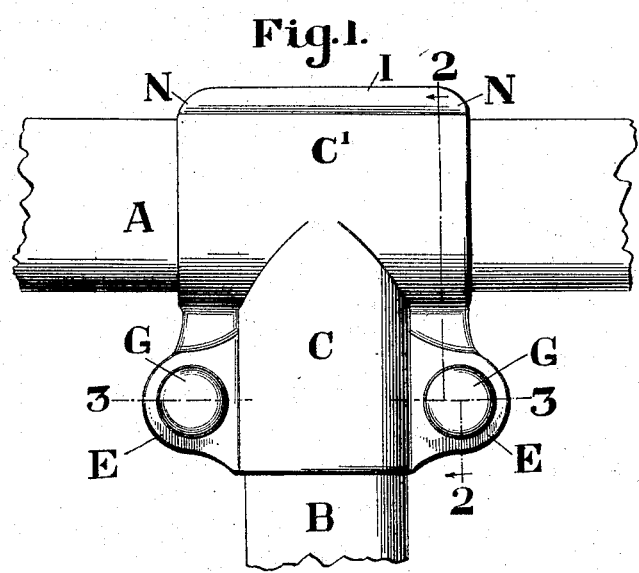
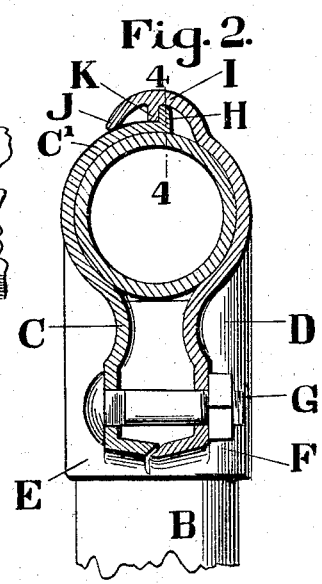
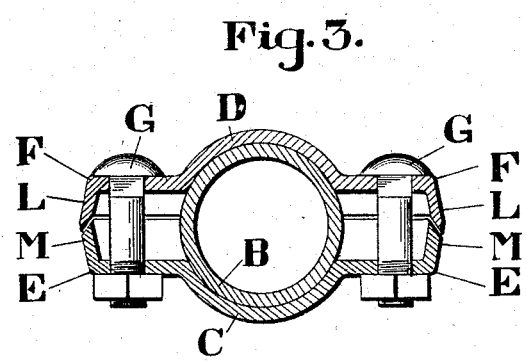
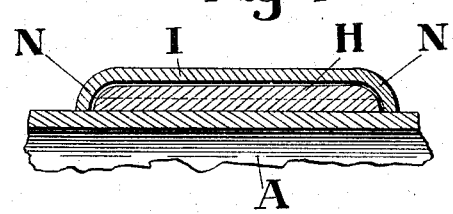
Inventor
William Louden
By Vernon E. Hodge
his Attorney

UNITED STATES PATENT OFFICE.

WILLIAM LOUDEN, OF FAIRFIELD, IOWA.

STRUCTURAL COUPLING.

1,192,216.  Specification of Letters Patent.  Patented July 25, 1916.

Application filed February 5, 1913. Serial No. 746,323.

*To all whom it may concern:*

Be it known that I, WILLIAM LOUDEN, a citizen of the United States, residing at Fairfield, in the county of Jefferson and State of Iowa, have invented a new and useful Improvement in Structural Couplings, of which the following is a specification.

My invention relates to couplings intended principally to connect the frame elements of cattle stalls together, although it may be used for other purposes.

It comprises two coupling members designed to embrace and hold frame elements between them and means to clamp the members together, and it consists of a construction and arrangement of the members whereby they will be more sanitary than those heretofore in use; also, of other features hereinafter described and duly defined in the claims.

In the accompanying drawings: Figure 1 is a side view of a coupling applied to two sections of tubing at right angles to each other, such as are generally used in the construction of cattle stalls, and which embodies my invention, Fig. 2 is a transverse section on line 2—2 of Fig. 1, looking in the direction of the arrow, Fig. 3 is the same on line 3—3 of Fig. 1, and Fig. 4 is a longitudinal section on line 4—4 of Fig. 2, taking in the entire width of the coupling as shown by Fig. 1, the upper portion of the tubing being shown broken away.

Referring to the drawings, A and B are sections of tubing set at an angle to each other so as to form a T.

C and D are mating members of the coupling used to join the sections together. The lower ends of the members (as shown in the drawing) are made to fit the contour of the section B and are fitted on their opposite sides with lugs E and F, having openings in which bolts G are placed to draw these ends together to securely grip the section B between them. The other ends of the members C and D are made to fit the contour of the section A which are preferably set at right-angles to the section B, as shown in the drawing, but may be set at the angle required for the purpose intended. The member C is fitted with an outstanding lip or flange H along its upper or outer end which is cut away at the edges of the member for the purpose hereafter stated. The meeting end of the member D is provided with an outwardly curved or arched portion I, having its extreme end J drawn inwardly to overlap and come in contact with the portion C' of the member C. A centrally located inwardly extending lip K is formed on the inner or concave side of the part I which is adapted to catch on the outstanding lip or flange H.

When the members C and D are placed in the coupling position on the sections A and B, the lips or flanges H and K will catch against each other, and the bolts G being inserted in the lugs E and F and tightened up will draw the members together, and will hold the sections A and B securely between them. The engagement of the lips H and K insures a slight hinge effect, this end of the members being first connected together and the other ends being afterward drawn together by the bolts G, thus clamping the members on the frame elements.

Experience has proved that couplings made of two members and clamped together are much more convenient and practical in the construction of cattle stalls than single piece couplings, but these two piece couplings, as heretofore made, have been more or less objectionable on account of their unsanitary construction.

One of the objects of my invention is to overcome this objection. The exterior portions of the members C and D are made smooth and symmetrical and are practically free from notches or crevices which will catch and hold dirt. The outwardly curved or arched portion I is not needed so much to cause the lips or flanges H and K to catch against each other, and thereby lock the members, as to provide this part of the coupling with a smooth symmetrical exterior that will be free from recesses or crevices which would render it unsanitary. The ends of the flange H are cut away so the sides N of the arched portion I can be rounded down to cover it, and to close any crevices which might become filled with dirt or disease germs. The meeting edges of flanges L and M on the lugs E and F are beveled, one inwardly and the other outwardly, so that they may be drawn more closely together than if they were left square or flat. Hitherto these flanges have stood apart or one of them has been overlapped on the other to close the space between them. While the overlapping may be better than leaving an opening between the flanges, it is still objectionable because it forms an off-set or shoulder on the exterior of the coupling which will consequently afford lodgment for dirt and debris. The flanges on the lugs E and F being beveled in opposite directions will be practically even on their outer faces, and the edges being thin and springy, the coupling members can always be drawn closely together and the opening closed by the overlying flanges. They will also permit of some variation in the size of the section B, as they can be sprung to some extent by the tightening of the bolts to securely grip the section. If any of the edges should be sprung slightly outward so as to become uneven, they can be easily smoothed off with a few cuts of a file, which could not be readily done if the edges of the flanges were left square and simply overlapped.

It will be readily seen that the construction described furnishes an internal lock, or interlock, which is completely inclosed by the outwardly curved or arched portion I of the member D, which effectually excludes dirt and even dust from entering the internal part of the lock.

If desired, the recesses between the spaced apart lugs E and F may be filled with soft cement or other plastic material which will be held securely in place by the flanges L and M. Also spacing apart the lugs E and F, and placing beveled flanges on their outer edges will so enlarge them that their exterior surface may be made smoother and more rounded, whereby the cleaning necessary to keep the coupling in a strictly sanitary condition will be facilitated.

By means of the construction shown the coupling will not only hold the section securely together, but it will also present a smooth, symmetrical and pleasing appearance. It will be easy to clean and easy to keep clean, thereby insuring a strictly sanitary condition.

What I claim is:

1. A structural coupling, comprising two mating members designed to hold frame elements between them, said members having at one of their meeting edges interfitting portions constituting a positive overhanging interlocking means for said edges, outwardly-extending lugs on the other edges of the members, said lugs being spaced apart and provided with inwardly extending flanges adapted to abut each other at the edges, the meeting edges of said flanges being beveled in opposite directions, whereby when they are drawn together, the interlocking means is tightened and the circumferential clamping effect upon the frame elements is increased, and means to draw said lugs together.

2. In a device of the character described, two mating members designed to hold frame elements between them, an outstanding flange on one end of one of the members, an outwardly arched portion on the mating end of the other member, adapted to pass over said outstanding flange and lap on the body of the other member, a centrally-located inwardly-extending lip on the inner or concave side of said arched portion adapted to catch against the outstanding flange on the other member, and means to draw the other ends of the members together.

3. In a device of the character described, two mating members designed to hold frame elements between them, an outstanding flange on one end of one of the members, an outwardly arched portion on the mating end of the other member, adapted to pass over said outstanding flange and lap on the body of the other member, a centrally-located inwardly-extending lip on the inner or concave side of said arched portion adapted to catch against the outstanding flange on the other member, and means to draw the other ends of the members together, the ends of the outstanding flange being cut away, and the edges of the outwardly arched portion being rounded down to inclose the cut-away ends of the outstanding flange.

4. In a device of the character described, two mating members designed to hold frame elements between them, an outstanding flange on one end of one of the members, an outwardly arched portion on the mating end of the other member, adapted to pass over said outstanding flange and lap on the body of the other member, a centrally-located inwardly-extending lip on the inner or concave side of said arched portion adapted to catch against the outstanding flange on the other member, and means to draw the other ends of the members together, the ends of the outstanding flange being cut away, and the edges of the outwardly arched portion being rounded down to inclose the cut-away ends of the outstanding flange, and the free end of the arched portion being drawn in to come in contact with the body of the other member.

Fairfield, Iowa, Feb. 3, 1913.

WILLIAM LOUDEN.

Witnesses:
CARRIE L. BEEDLE,
BENTON STEELE.

Copies of this patent may be obtained for five cents each, by addressing the "Commissioner of Patents, Washington, D. C."